United States Patent Office 3,229,369
Patented Jan. 18, 1966

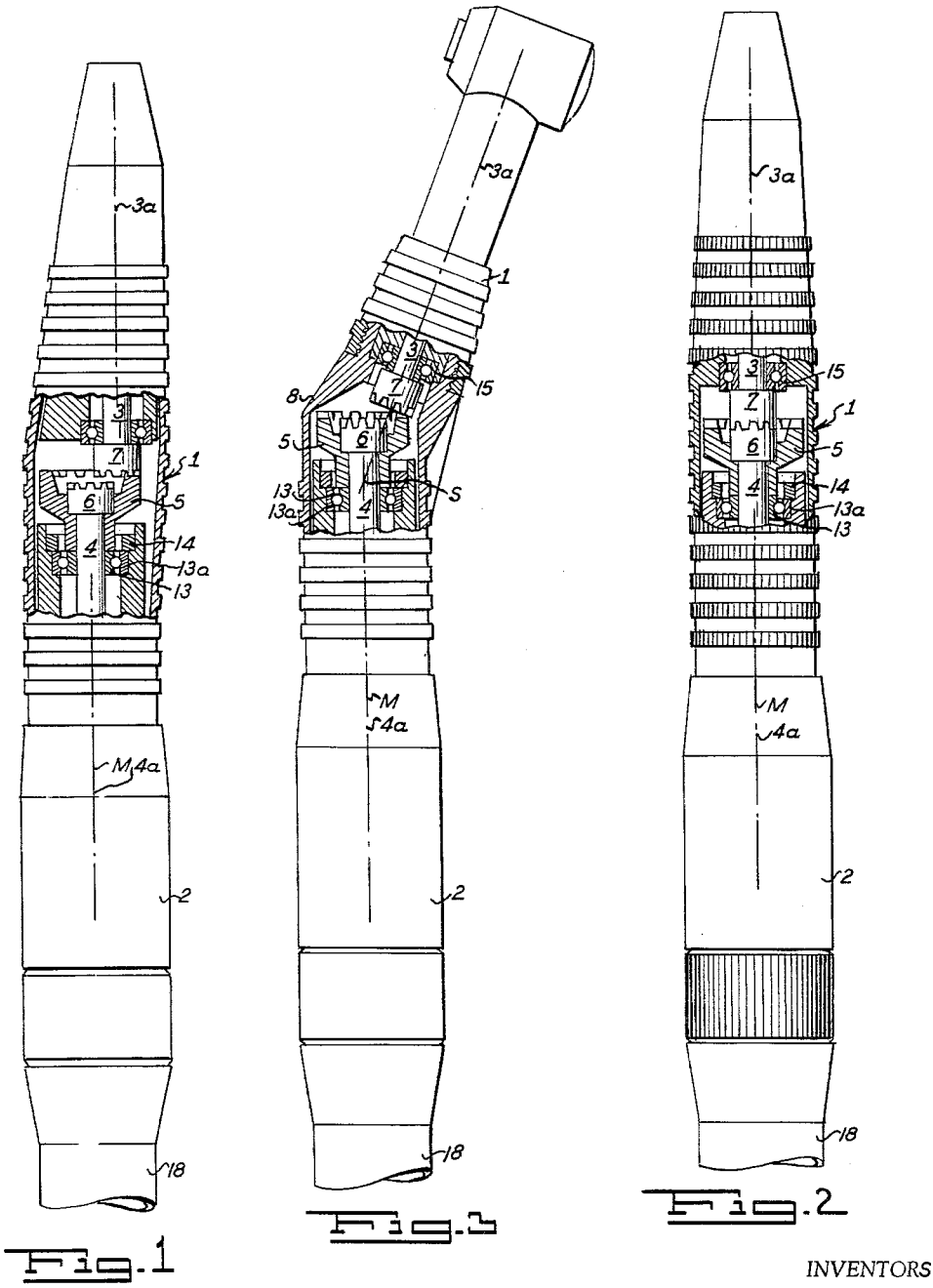

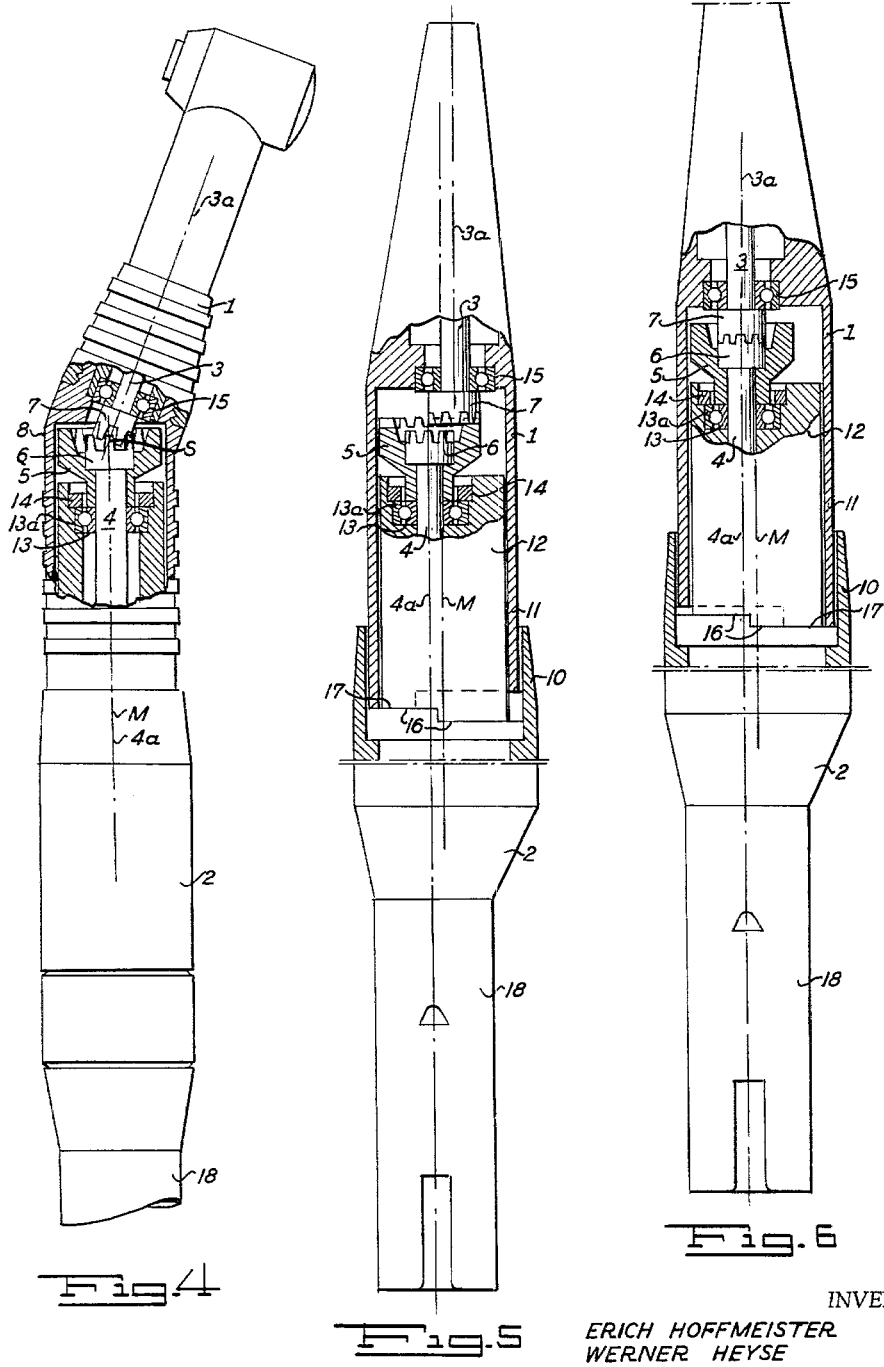

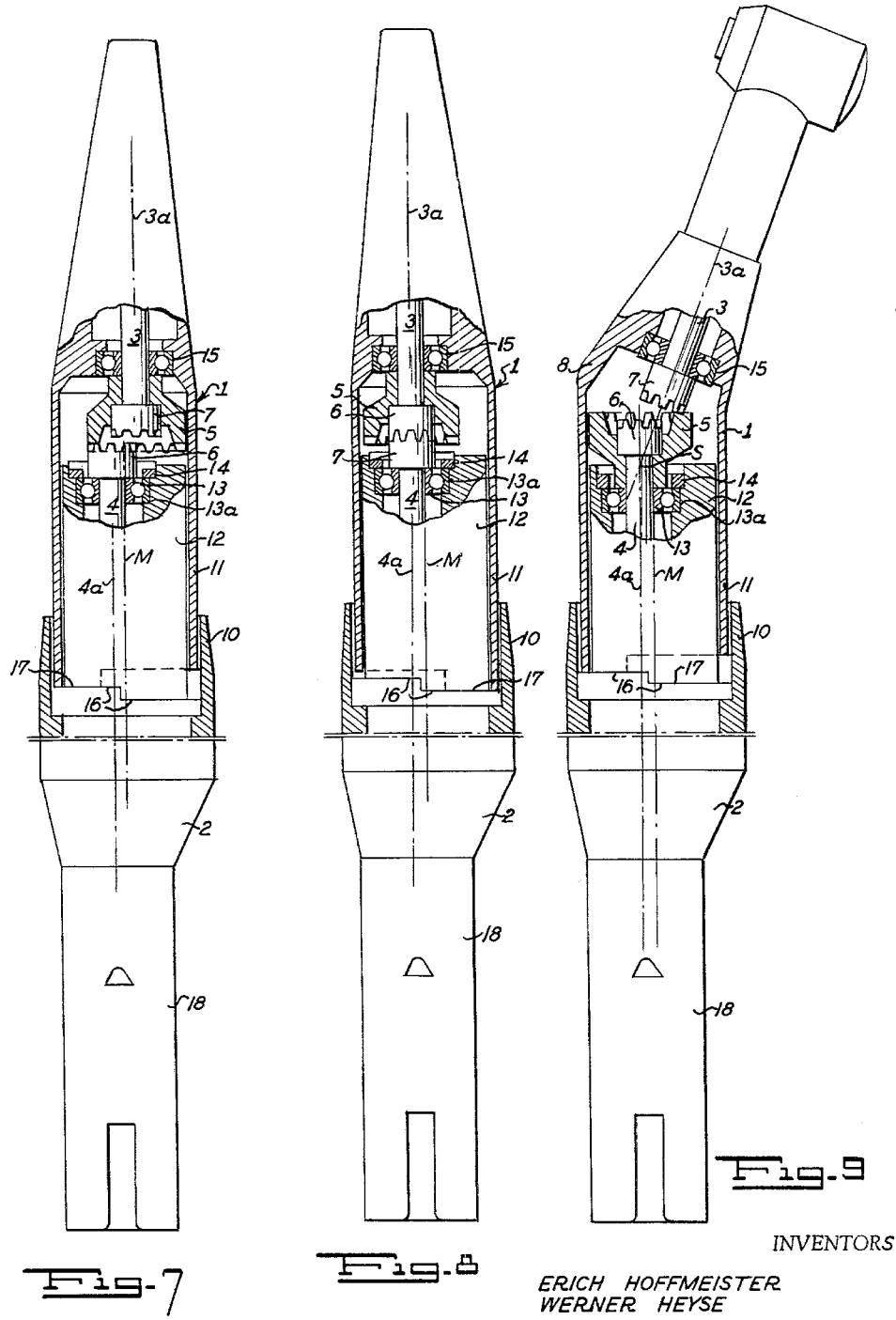

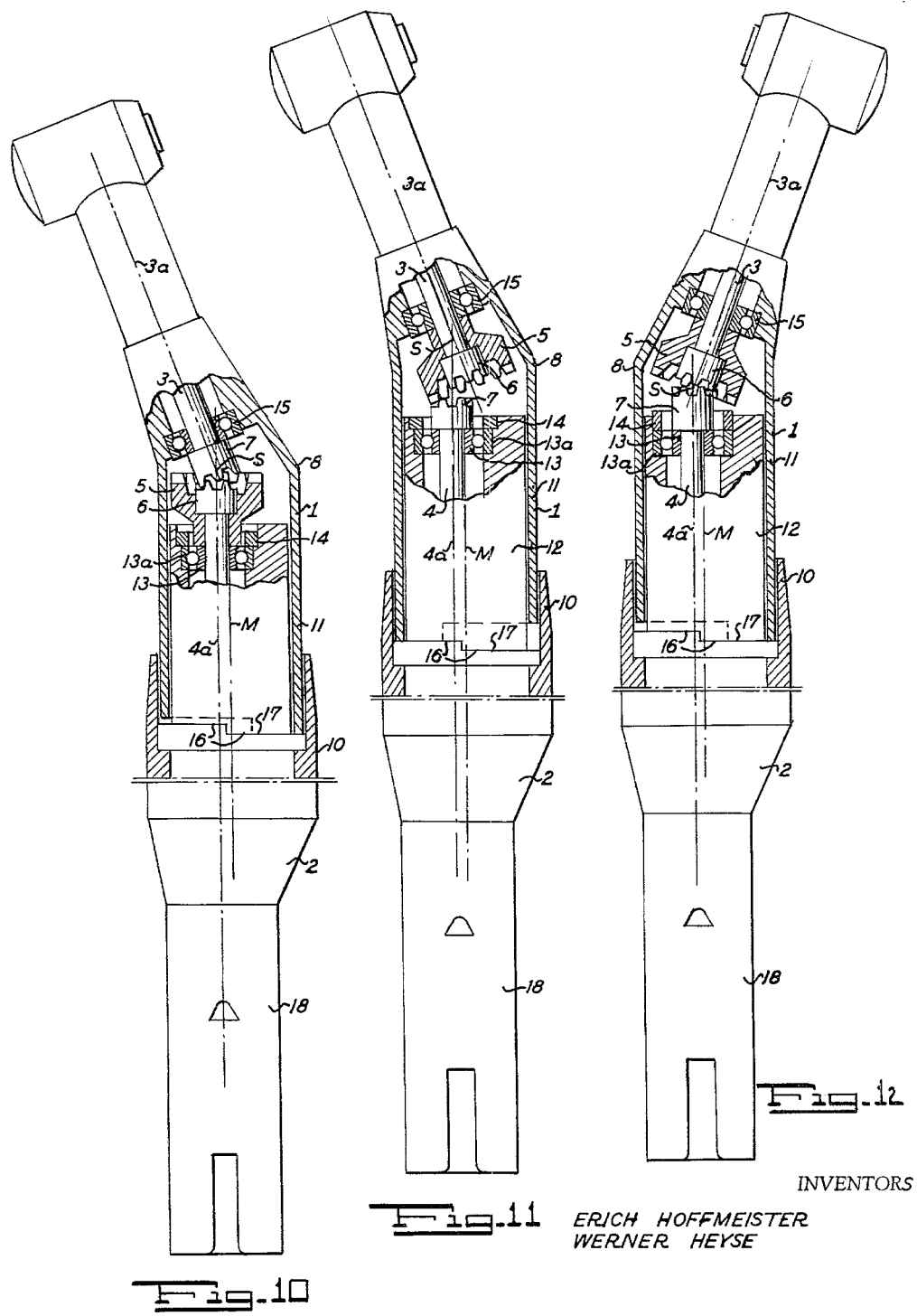

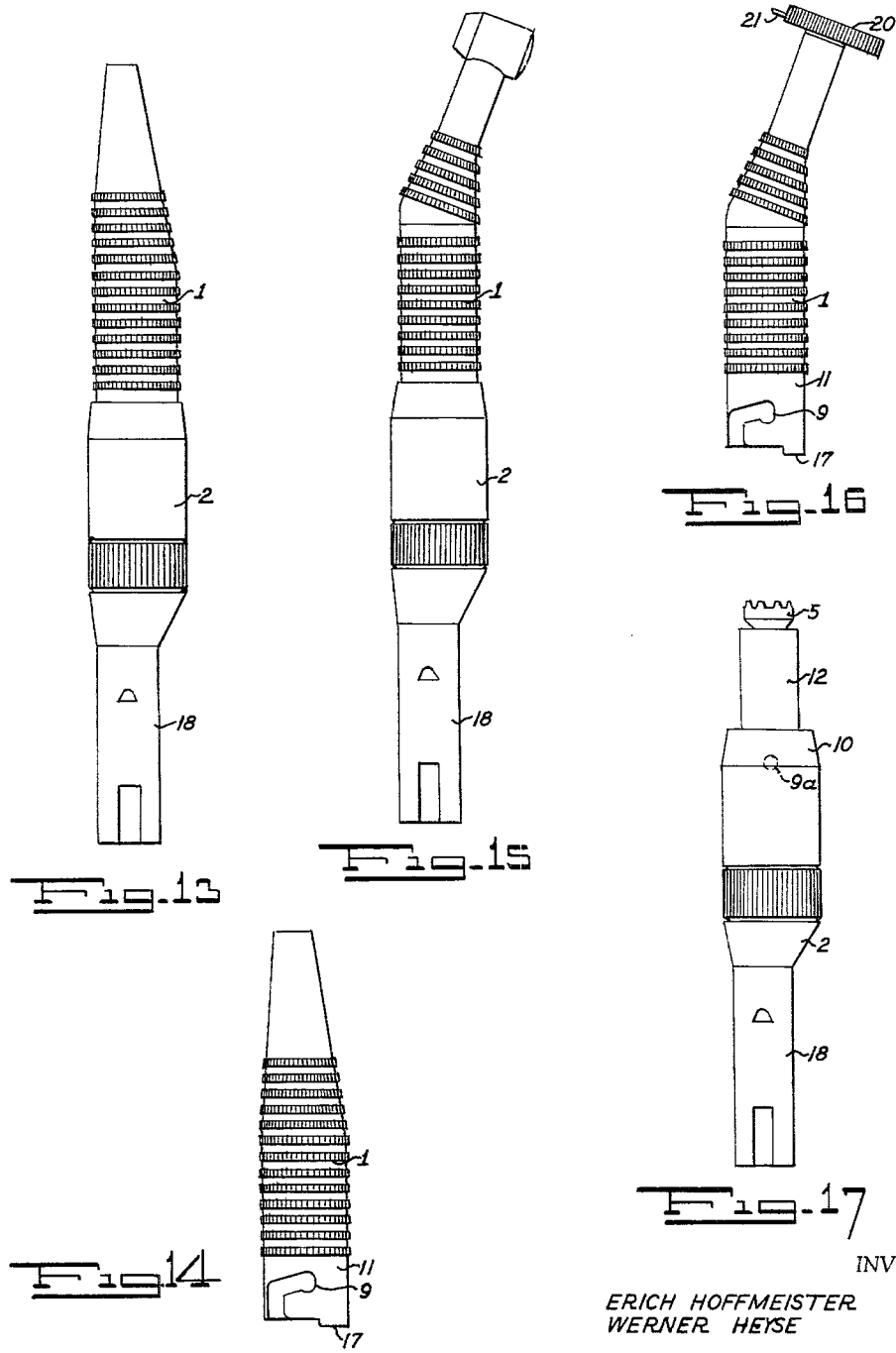

3,229,369
DENTAL HANDPIECES
Erich Hoffmeister and Werner Heyse, Biberach (Riss), Germany, assignors to Kaltenbach & Voigt, Biberach (Riss), Germany, a German company
Filed Feb. 19, 1963, Ser. No. 259,557
Claims priority, application Germany, Mar. 2, 1962, K 46,060
2 Claims. (Cl. 32—27)

This invention relates to straight or angle dental handpieces.

It is known for the driving shaft arranged within the handpiece to be divided transversely and for the two shaft parts to be engaged with one another through the agency of a gear. This gear comprises gearwheels mounted on each of the associated driving shaft parts, the gearwheel arranged on the shaft part nearest the drive having a larger number of teeth and therefore a larger diameter than the gearwheel arranged on the shaft part nearest the tool. The arrangement of the gear of this kind makes it possible to step up the speed by means of this gear.

In known straight or angle handpieces equipped with gears, however, the tool can rotate only at a specific speed, apart from known regulating means which may be interposed before the straight or angle handpiece in the line of drive.

An object of the invention is to provide a straight or angle dental handpiece which is not limited only to one rotational speed of the tool.

In accordance with the invention there is provided a straight or angle dental handpiece within which there is arranged a driving shaft which is transversely divided, a gear for drivingly interconnecting the two parts of the divided drive shaft, and means for the stepwise changing of the transmission ratio of said gear.

It is possible for at least two rotational speeds of the tool to be set by the gear arranged within the handpiece. Thus, the dentists no longer has to replace the known geared-up handpiece by a handpiece provided with a straight-through drive when he requires a lower speed range for the tool, and vice versa.

The gear may comprise at least two co-axial gearwheels fixed on the end of one shaft part and having different numbers of teeth from one another, and at least one gearwheel fixed on the end of the other shaft part. The gear provided by this form of embodiment permits of particularly simple adjustment of the gear.

In accordance with a further form of embodiment of the invention, one gearwheel on the end of one shaft part and one gearwheel on the end of the other shaft part, have the same number of teeth as one another.

This form of embodiment makes it possible to adjust the gear to direct transmission of drive from the drive-side shaft part to the tool-side shaft part.

In a further convenient form of embodiment, the gear is arranged in the vicinity of the end of the handpiece nearest to the tool. In the case of angle handpieces having a shank elbow, it is proposed that the gear be arranged in the shank elbow.

Particularly simple adjustment of the gear can be effected if the straight or angle handpiece be transversely divided in the vicinity of the gear, preferably between the gear and the drive-side end, and the two parts of the handpiece are adapted to be locked to one another in the working position.

In a further modification of the aforesaid embodiment, the adjustment of the gear can be effected by making one of the two handpiece parts so adjustable relatively to the other that the position of its shaft part is varied during adjustment, and the gearwheels which had been in mesh before adjustment are disengaged from one another and another gear combination is established during said adjustment. Expediently, the shaft parts may be so arranged in the two handpiece parts and the adjustable handpiece part may be adapted to be adjusted in such a manner that its shaft part is displaced parallel to itself during adjustment.

In accordance with a further aspect of the invention, particularly in the case of straight and angle handpieces which do not have a shank elbow, the toothed rims of the plurality of gearwheels arranged at one end of the shaft parts, may be arranged in different, axially offset planes and at least one shaft part may be adjustable in the direction of or parallel to its axis in order to obtain the engagement of its wheel or wheels with the associated gearwheel of the other shaft part. This embodiment permits changing of the gear ratio in a simple manner, particularly in the case of the straight and angle handpieces which do not have a shank elbow, without the toothed rims of the various gearwheels constituting an obstacle.

In a further form of embodiment, the two handpiece parts may be releasable from one another, to permit replacement of the gear.

One possibility of adjusting the gear by interchanging one handpiece part for another is obtained if according to a further embodiment, including straight and angle handpieces, with or without shank elbows, at least two constructions of the tool-side part of the handpiece in each case are provided which can be interchanged with one another in order to bring about adjustment of the gear, the respective shaft parts in each case being arranged in positions which vary between the different constructions, so that when connecting to the drive-side handpiece part a different pair of gearwheels engage in each case. If the rotational speed range of the tool is to be changed, the dentist merely has to interchange the tool-side part of the handpiece with another part, and the part to be interchanged can be kept very short so as to keep the cost of several constructions of the tool-side handpiece part lower than the expense of several of the known non-divided straight and angle handpieces having different transmission ratios from one another.

For adaptation to the toothed rims of the plurality of gearwheels arranged on one end of the shaft parts, the said rims being arranged in different, axially offset planes, the shaft parts of the interchangeable handpiece parts may be of different length in order to permit engagement in the relevant gearwheel in the drive-side handpiece part in each particular case.

Adjustment of the gear can be obtained if for straight and angle handpieces with and without shank elbows only one construction of the tool-side handpiece part is provided. For example, the two handpiece parts can be rotatable about a common central axis and their shaft parts can be arranged eccentrically with respect to the common axis or, in the case of straight and angle handpieces having a shank elbow, the point of intersection of the axes of the shaft parts can be situated outside the common axis, and the eccentricity can correspond to half the difference of the radii of the largest and smallest gearwheels of the gear, the radii being defined by the different numbers of teeth in these gearwheels. This form of embodiment permits particularly simple adjustment of the gear with only one construction of the tool-side handpiece part.

For adaptation to the toothed rims of the several gearwheels arranged on the shaft parts, said rims being arranged in different axially offset planes, the two handpiece parts may be adapted to be locked to one another with various axial spacings, each adjustable spacing corresponding to the meshing of gears of particular sets of teeth.

In order to establish the various axial spacings, the abutting ends of the two handpiece parts may comprise axially disposed step-like abutments in order to achieve the various axial spacings.

According to a further embodiment, if there are two gearwheels with different numbers of teeth on one shaft part and only one gearwheel on the other shaft part, the abutting ends of the two handpiece parts have only one abutment each.

The two handpiece parts may be so constructed that they can be locked to one another in the working positions by bayonet joints.

For a better understanding of the invention and to show how it may be carried into effect, several embodiments thereof will now be described, by way of example, with reference to the accompanying drawings, in which:

FIGURE 1 is a view, partly in section, of a non-elbowed, transversely divided, straight dental handpiece with its gear in such a position that a step-up in speed can be obtained, FIGURE 2 shows the handpiece according to FIGURE 1 with the gear position modified, FIGURE 3 shows a transversely divided dental handpiece of angle type having a shank elbow and with the gear in the position corresponding to FIGURE 1, FIGURE 4 shows the angle handpiece according to FIGURE 3 with the gear in the position shown in FIGURE 2, FIGURE 5 shows a form of embodiment modified relative to FIGURE 1, FIGURE 6 shows a form of embodiment modified relative to FIGURE 2, FIGURE 7 shows the form of embodiment according to FIGURE 5 with the gear in such a position that a step-down in speed can be obtained, FIGURE 8 shows the form of embodiment according to FIGURE 7 with the gear in a different position, FIGURE 9 shows a form of embodiment modified from that of FIGURE 3, FIGURE 10 shows the form of embodiment according to FIGURE 9 with the gear in a different position, FIGURE 11 shows the form of embodiment according to FIGURE 9 with the gear in such a position that a step-down in speed can be obtained, FIGURE 12 shows the form of embodiment according to FIGURE 11 with the gear in a different position, FIGURE 13 is an overall view of the form of embodiment according to FIGURES 6 and 8, FIGURE 14 is a view of the tool-side part of the handpiece according to FIGURE 13.

FIGURE 15 is an overall view of the form of embodiment according to FIGURES 9 and 12, FIGURE 16 is a view of the tool-side part of a handpiece according to a modification of the embodiment of FIGURE 15, and FIGURE 17 is a view of the drive-side part of the handpiece according to FIGURES 13 and 15.

As shown in the drawings, each of the illustrated forms of embodiment comprises a straight or angle dental handpiece which is divided transversely. The handpiece has a tool-side or instrument-supporting part which is designated 1 and a base part nearest the drive and designated 2. A driving shaft which extends through the interior of the handpiece parts 1, 2 is also transversely divided. The tool-side part of the driving shaft is designated 3 and the drive-side part thereof is designated 4. The two shaft parts 3, 4 engage with one another through the agency of a gear. In the illustrated forms of embodiment, the gear comprises two gearwheels 5 and 6 fixed in coaxial manner on the end of one shaft part, and a gearwheel 7 which is fixed to the end of the other shaft. The gearwheels 5 and 6 differ from one another in respect of the number of teeth and thus in respect of the diameter of the gearwheels.

In principle, transverse division of the handpiece is not necessary in order to permit the stepwise changing of the ratios of the gear 5, 6, 7. But transverse division permits particularly simple gear changing. Furthermore, it is possible in principle to arrange more than two gearwheels on the end of one shaft part and more than one gearwheel on the end of the other shaft part.

The drawings also show that one of the two gearwheels 5 and 6, namely the gearwheel 6 at the end of one shaft part has the same number of teeth and therefore the same diameter as the gearwheel 7 at the end of the shaft part. The other of the two gearwheels arranged at the end of said one shaft part, namely the gearwheel 5, has a larger number of teeth and therefore a larger diameter than the gearwheel 7 arranged on said other shaft part.

The drawings also show that the gear is arranged in the vicinity of the tool-side end of the handpiece 1, 2. As shown in FIGURES 3, 4, 9, 10, 11 and 12, in the case of angle handpieces having a shank elbow the gear is provided in the region of the shank elbow 8.

As FIGURES 13 to 17 show particularly, the two handpiece parts 1, 2 are adapted to be locked to one another, namely by means of a bayonet joint 9, 9a.

The drawings also show that the toothed rims of the two gearwheels 5 and 6 arranged on one shaft part are disposed in different, axially offset planes. In order that gear-changing and therefore a change-over from engagement of the gearwheel 7 with the gearwheel 5 to engagement of the gearwheel 7 with the gearwheel 6 and vice versa can take place, the tool-side shaft part 3 is adjustable in the direction of the axis 3a as a comparison of FIGURES 1 and 2, for example, will show. A comparison of FIGURES 1 and 2, for example, also shows that the shaft parts 3 and 4 are so arranged in the relevant handpiece parts 1 and 2 and the handpiece part 1 is so adjustable that its shaft part 3 during adjustment is displaced parallel to itself and in so doing disengages one pair of gearwheels and engages a different pair.

Particularly in the forms of embodiment according to FIGURES 1 to 4 and 13 to 17, the two handpiece parts 1 and 2 are adapted to be released from one another. In this case, as the aforesaid figures show, for non-elbowed straight handpieces (FIGURES 1, 2, 13 and 14), for non-elbowed angle handpieces, for straight handpieces having a shank elbow and angle handpieces having a shank elbow (FIGURES 3, 4, 15, 16), they are provided in each case, with at least two mutually interchangeable constructions of the tool-side part 1 of the handpiece. The respective shaft parts of these interchangeable handpiece parts 1 are arranged, as will be apparent, for example, from a comparison of FIGURES 1 and 2, in a position different from the position obtaining with the other construction, so that when interchanging takes place and connection is again established with the drive-side handpiece part 2, different gearwheels are in engagement from what had been the case previous to interchanging. In this way, the transmission ratio effective in the gear 5, 6, 7 can easily be changed. The gear-changing takes place in the same way in FIGURES 3, 4, 15 and 16.

In order that during the interchanging of the tool-side handpiece part 1 according to FIGURES 1 to 4 and 13 to 16 for adaptation to the toothed rims of the gearwheels 5 and 6, said rims being arranged in axially offset planes, adjustment of the shaft part 3 of the tool-side handpiece part 1 takes place parallel to its axis 3a, the shaft parts 3 of the interchangeable handpiece parts 1 are given different lengths from one another, as will again be apparent from a comparison of, for example, FIGURES 1 and 2 and also FIGURES 3 and 4.

In the forms of embodiment shown in FIGURES 1 to 4, the axis of rotation 4a of the shaft part 4 of the drive-side handpiece part 2 coincides with the common central axis M of the straight or angle handpiece 1, 2.

The forms of embodiment shown in FIGURES 5 to 17 differ in this respect. In the forms of embodiment wherein only one constructional form of the tool-side handpiece part 1 is (can be, according to FIGURES 13 to 17) provided for straight and angle handpieces with and without shank elbows according to FIGURES 5 to 12, the two handpiece parts 1, 2 are rotatable relatively to one another about their common axis M in order to effect gear-changing. The shaft parts 3 and 4 or rather their axes 3a and 4a in the two handpiece parts 1 and 2 are arranged eccentrically with respect to the common axis M. In case of the angle handpieces with shank elbow shown in FIGURES 9 to 12 and 16, the point of intersection S of the shaft parts 3 and 4 or of their axes 3a and 4a is situated outside the common centre axis M. In both cases, i.e. both in the case of non-elbowed straight and angle handpieces and also in the case of straight and angle handpieces having a shank elbow, the aforesaid eccentricity corresponds to half the difference of the radii of the two gearwheels 5 and 6, the radii being defined by the different number of teeth in the gearwheels 5 and 6.

Rotation of the tool-side handpiece part 1 through 180° in the forms of embodiment shown in FIGURES 5 to 17 effects a gear change, i.e. in each case two gearwheels are disengaged from one another and the line of drive is re-established through a different pairing of wheels, as a comparison of FIGURES 5 and 6 will show for example.

As FIGURES 5 to 17 show, the handpiece part 2 which is nearest to the drive has a sleeve-like extension 10 into which the sleeve-like extension 11 which is also provided on the tool-side handpiece part 1 is adapted to be inserted. Provided for supporting the shaft part 4 of the tool-side handpiece part 2 is a bearing housing 12 which projects beyond the sleeve 10 of the drive-side handpiece part 2 and from which the shaft part 4 with its gearwheels 5 and 6 projects. The front bearing of the shaft part 4 is designated as 13. At the same time the bearing housing 12 serves as a guide for the sleeve 11 of the tool-side handpiece part 1. The said handpiece part 1 both for non-elbowed straight handpieces and also for angle handpieces having a shank elbow is provided with the aforesaid sleeve 11, as the drawings show.

The clamping ring which is used for clamping or securing the outer race 13a of the ball bearing 13, is designated as 14.

The drive-side bearing of the shaft part 3 in the tool-side handpiece part 1, is designated as 15.

In order that when changing over from one wheel engagement arrangement to another there is appropriate adaptation to the toothed rims of the two gearwheels 5 and 6, which rims are arranged in axially offset planes, and thus a modification of the axial spacings of the two handpiece parts 1 and 2 and adjustment of the shaft part 3 of the tool-side handpiece part 1 in the direction of its axis 3a, the abutting ends of the two handpiece parts 1 and 2, namely on the one hand the end of the sleeve 11 and on the other hand the base of the sleeve 10 are provided with stepped abutments 16 and 17. For example in the forms of embodiment according to FIGURES 9 and 10, in the position shown in FIGURE 9 there must be a greater axial spacing between the two handpiece parts 1 and 2 than in the case of the position shown in FIGURE 10. This is obtained in that in the position shown in FIGURE 9 the abutment edge 17 of the tool-side handpiece part 1 bears on the upper (in the drawings) abutment edge 16 of the drive-side handpiece part 2. In the case of the position shown in FIGURE 10, the single gearwheel 7 of the tool-side handpiece part 1 is in mesh with the smaller of the two gearwheels 5 and 6, namely the gearwheel 6. Since the toothed rim of the gearwheel 6 is arranged in a plane which is offset downwardly in the illustraton in the sense relatively to the gearwheel 5, in the form of embodiment shown in FIGURE 10 the shaft 3 of the tool-side handpiece part 1 must come into a lower position relatively to FIGURE 9, which is obtained by the aforesaid modification of the engagement at abutments 16 and 17. The same operation occurs in the event of gear-changing from the position shown in FIGURE 5 into the position shown in FIGURE 6 and from the position shown in FIGURE 11 into the position shown in FIGURE 12.

The abutment 17 of the sleeve 11 of the tool-side handpiece part 1 is also shown in the views shown in FIGURES 14 and 16.

The forms of embodiment according to FIGURES 1 and 2, 3 and 4, 5 and 6, 9 and 10 relate to straight or angle handpieces wherein the gear can be changed from straight through drive to geared-up driving of the tool and vice versa, whereas the embodiments shown in FIGURES 7 and 8, 11 and 12 relate to straight or angle handpieces wherein the gear can be changed from straight through drive to geared-down driving of the tool and vice versa. In principle, the forms of embodiment shown in FIGURES 1 to 4 can also be so constructed that the two gearwheels 5 and 6 e.g. in accordance with FIGURES 7 and 8, 11 and 12, are arranged on the shaft part 3 of the tool-side handpiece part 1 and the single gearwheel 7 is arranged on the shaft part 4 of the drive-side handpiece part 2, with the result that in the embodiments shown in the aforesaid FIGURES 1 to 4 also, the gear can be changed from straight through drive to geared-down driving and vice versa.

The drive-side end 18 of the drive-side handpiece part 2 is used for connection to a coupling fitting or to an articulated slip joint connection. The tool is not shown in the drawings, for the sake of simplicity.

The views shown in FIGURES 1 to 4 are broken away at the lower end, whilst the views shown in FIGURES 5 to 12 are broken away substantially in the middle. The views shown in FIGURES 13 to 17 are drawn approximately to natural scale.

In the form of embodiment of the tool-side handpiece part 1 shown in FIGURE 16, a separating head is provided instead of the contra-angle head which is shown for example in FIGURE 15. The separating head is a dental instrument which is used for cleaning and polishing teeth. A protection ring is designated as 20 and a polishing disc as 21.

Although the invention has been described in relation to a number of specific embodiments, nevertheless, numerous modifications and variations of the disclosed embodiments will become apparent to those skilled in the art without departing from the scope and spirit of the invention as defined in the following claims.

We claim:

1. A dental handpiece constituted by a base portion and an instrument-supporting portion, said portions having abutting ends, said handpiece comprising a divided drive shaft including a first portion supported in the base portion of the handpiece and a second portion supported in the instrument-supporting portion, a plurality of coaxial gears on one of the portions of the divided drive shaft and a single gear on the other of the portions of the divided drive shaft and means connecting said portions of said handpiece together for angular adjustment between a plurality of aligned positions in each of which said single gear on the other of said portions of the divided drive shaft is in driving connection with a respective gear on said one portion of the divided drive shaft, the latter said means providing different relative axial positions for said handpiece portions in said aligned positions corresponding to specific gear engagements, said means comprising axially extending step abutments on said portions at the abutting ends thereof which are selectively engaged in the said plurality of positions to establish the different axial positions of the handpiece portions.

2. A dental handpiece constituted by a base portion and an instrument-supporting portion, said handpiece comprising a divided drive shaft including a first portion supported in the base portion of the handpiece and a second portion supported in the instrument-supported portion, a pair of coaxial gears on one of the portions of the divided drive shaft and a single gear on the other of the portions of the divided drive shaft, and means connecting said portions of said handpiece together for adjustment between first and second aligned positions, said single gear on the other of the portions of the divided drive shaft being in driving connection with one of the coaxial gears on said one portion of the divided drive shaft in the first of said aligned positions while said single gear is in driving relation with the other of the coaxial gears in the second aligned position, said coaxial gears being axially spaced and having different numbers of teeth, said handpiece portions having ends which abut one another when the portions are connected together, said handpiece further comprising two axial abutment surfaces on one of the handpiece portions establishing different relative axial positions for the handpiece portions in said first and second aligned positions to permit said single gear to be engaged with a respective coaxial gear for each aligned position.

References Cited by the Examiner

UNITED STATES PATENTS

| 1,534,817 | 4/1925 | Thiedemann et al. | 32—26 |
| 1,836,350 | 12/1931 | Whiteside | 32—26 X |
| 2,185,229 | 1/1940 | Scott | 74—202 |
| 3,050,856 | 8/1962 | Staunt | 32—26 |

FOREIGN PATENTS

| 333,005 | 9/1903 | France. |

RICHARD A. GAUDET, *Primary Examiner.*

ROBERT E. MORGAN, DELBERT B. LOWE,
*Examiners.*